(12) United States Patent
Jacobson

(10) Patent No.: US 9,051,118 B2
(45) Date of Patent: Jun. 9, 2015

(54) PERFORATED STAND FOR CHEMICAL TANK

(71) Applicant: John I. Jacobson, Oak Hill, VA (US)

(72) Inventor: John I. Jacobson, Oak Hill, VA (US)

(73) Assignee: John I. Jacobson, Oak Hill, VA (US)

( * ) Notice: Subject to any disclaimer, the term of this patent is extended or adjusted under 35 U.S.C. 154(b) by 279 days.

(21) Appl. No.: 13/659,683

(22) Filed: Oct. 24, 2012

(65) Prior Publication Data

US 2013/0105491 A1     May 2, 2013

Related U.S. Application Data

(60) Provisional application No. 61/552,231, filed on Oct. 27, 2011.

(51) Int. Cl.
| | |
|---|---|
| *B65D 90/24* | (2006.01) |
| *F16N 31/00* | (2006.01) |
| *B65D 90/12* | (2006.01) |

(52) U.S. Cl.
CPC .............. *B65D 90/24* (2013.01); *F16N 31/006* (2013.01); *B65D 90/12* (2013.01)

(58) Field of Classification Search
CPC ....... B65D 90/24; B65D 90/12; F16N 31/006
USPC .......................................... 137/312; 220/571
See application file for complete search history.

(56) References Cited

U.S. PATENT DOCUMENTS

| | | | | |
|---|---|---|---|---|
| 5,033,638 | A * | 7/1991 | Cruver et al. | 220/571 |
| 5,254,798 | A * | 10/1993 | Zoback | 588/259 |
| 5,293,892 | A * | 3/1994 | Fourqurean | 137/3 |
| 5,562,047 | A * | 10/1996 | Forney et al. | 220/571 |
| 6,189,720 | B1 * | 2/2001 | Gillispie | 220/571 |
| 7,234,608 | B2 * | 6/2007 | Reed et al. | 220/571 |
| 7,621,422 | B2 * | 11/2009 | Reed et al. | 220/571 |
| 7,766,170 | B2 * | 8/2010 | Mansson et al. | 206/597 |

\* cited by examiner

*Primary Examiner* — Kevin Lee
(74) *Attorney, Agent, or Firm* — Lee, Hong, Degerman, Kang & Waimey

(57) ABSTRACT

Disclosed is natural gas or oil chemical injection system that includes at least one of a stand for a chemical storage tank, and a cover for a containment/spillage tank positioned under the chemical storage tank.

20 Claims, 18 Drawing Sheets

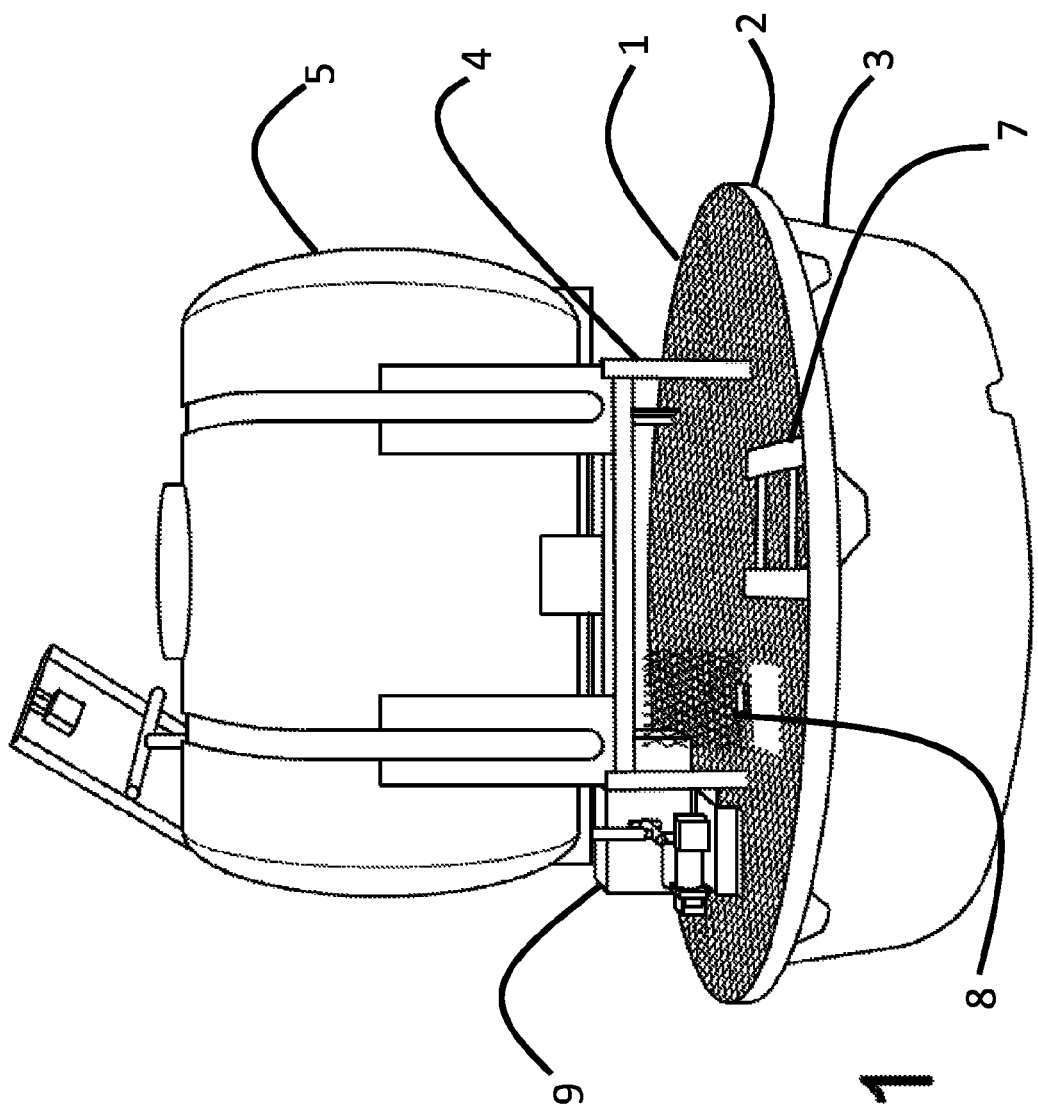

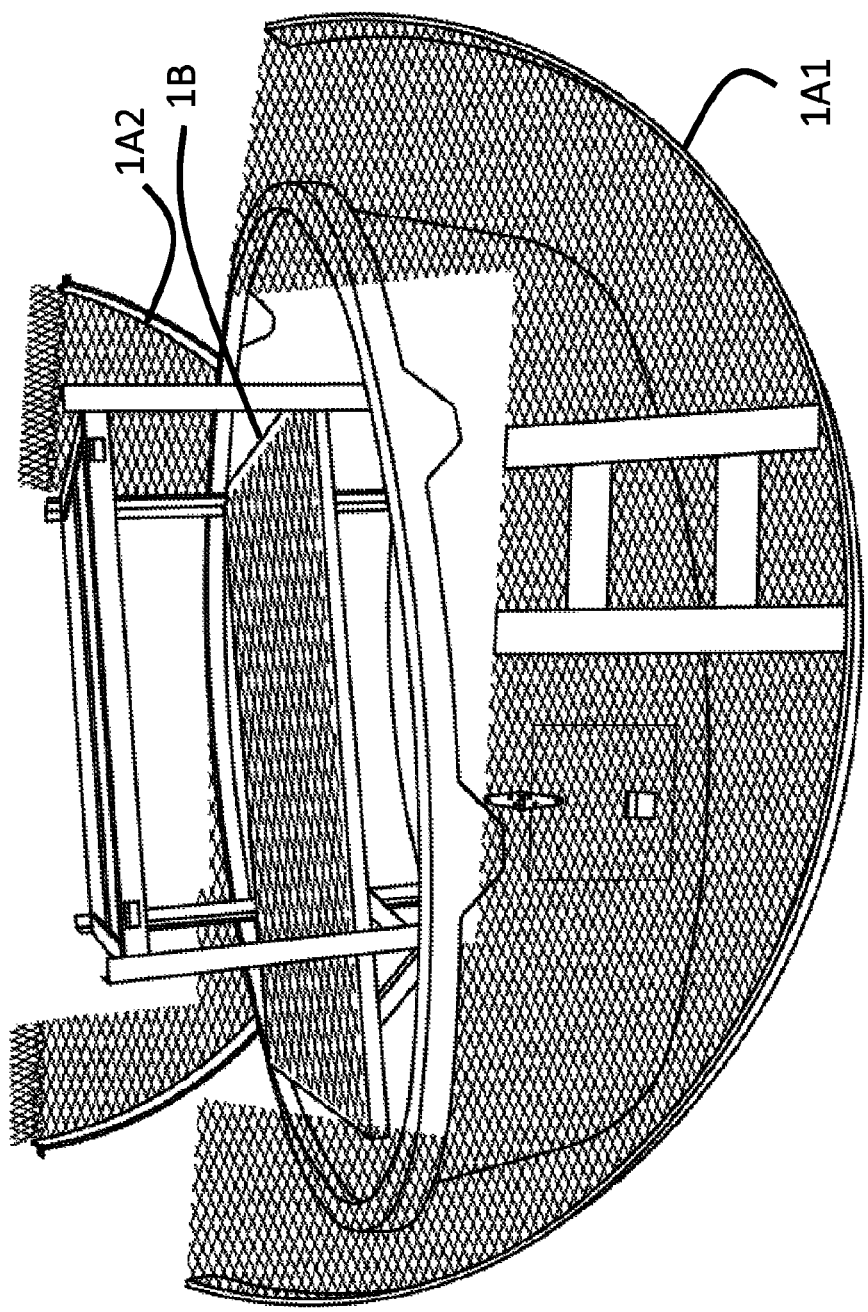

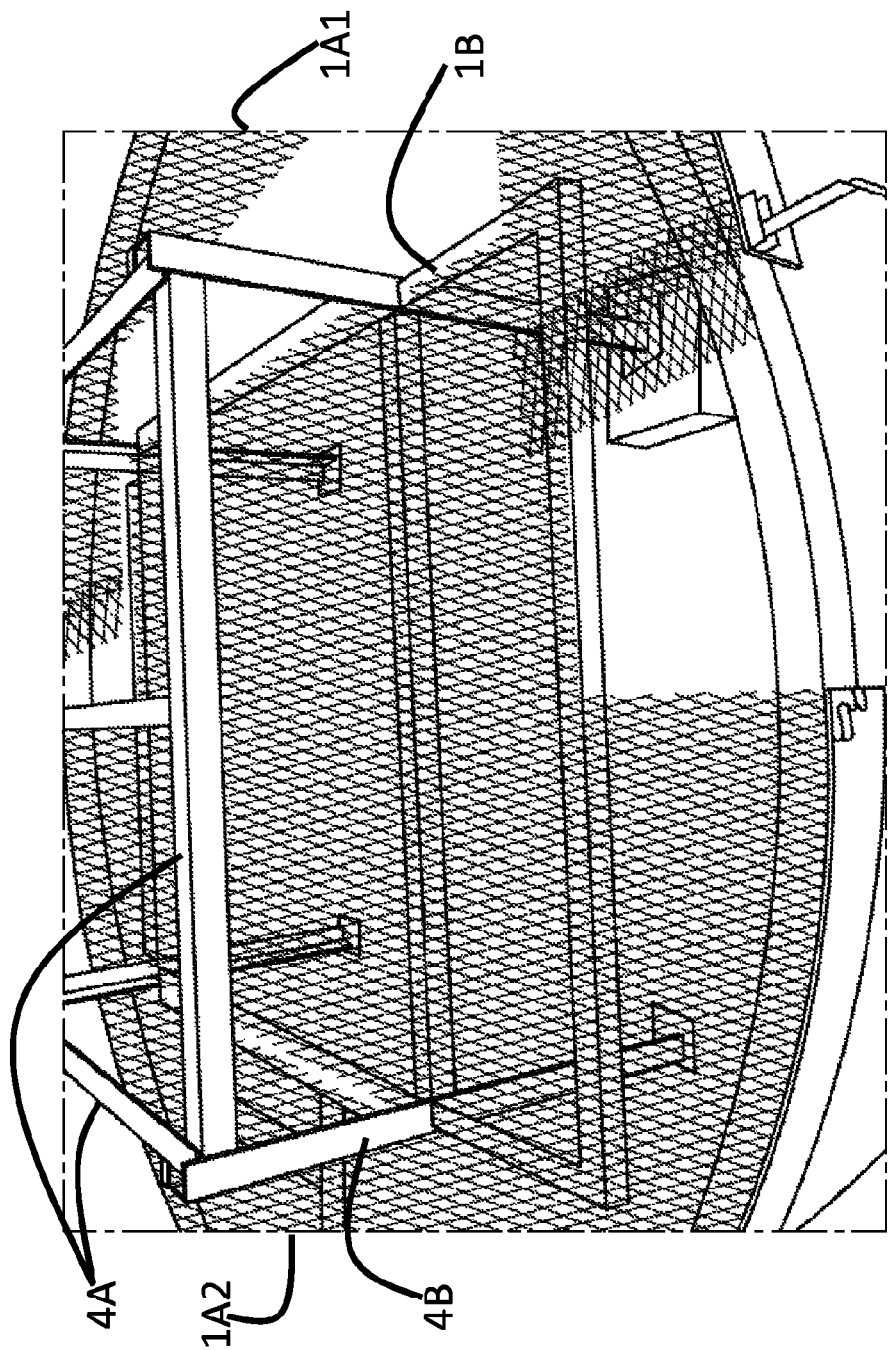

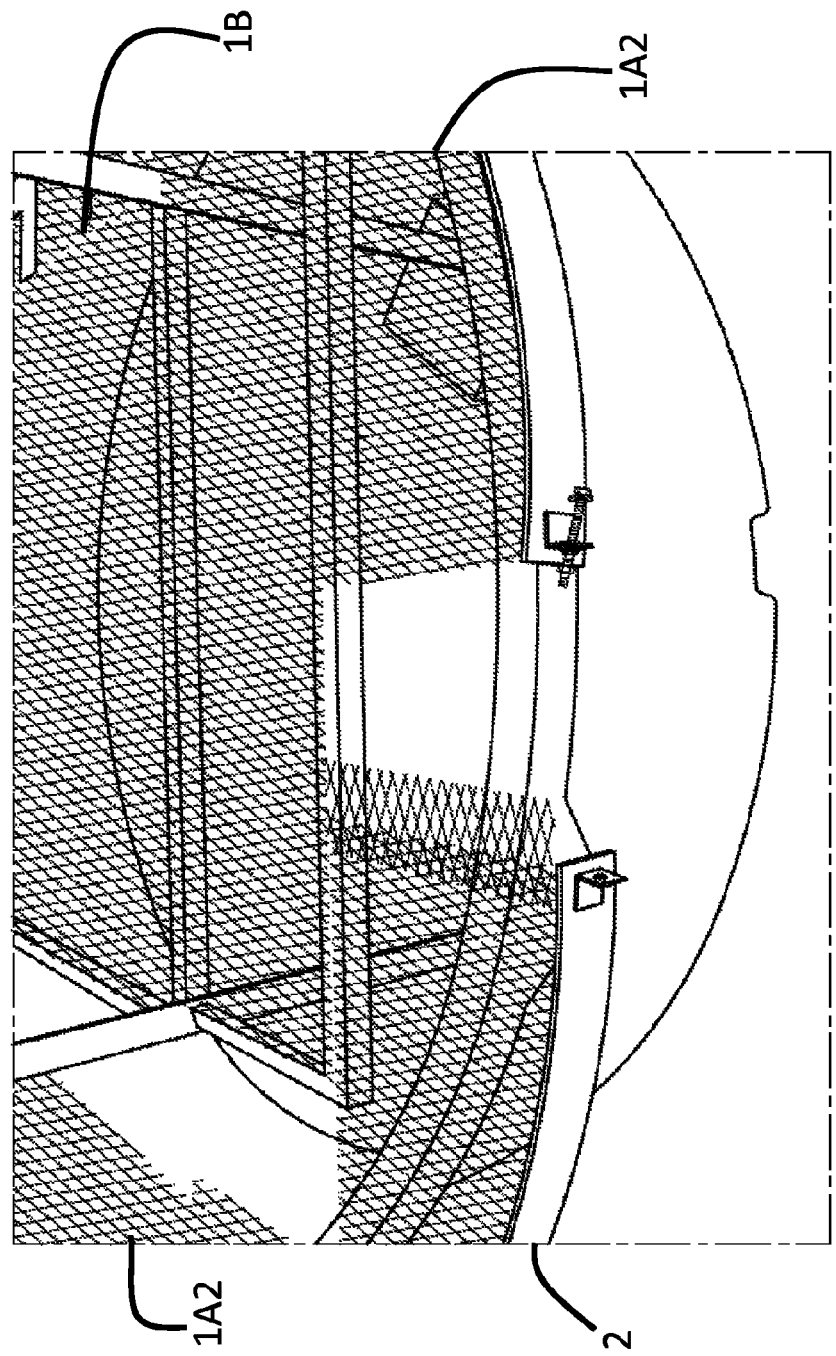

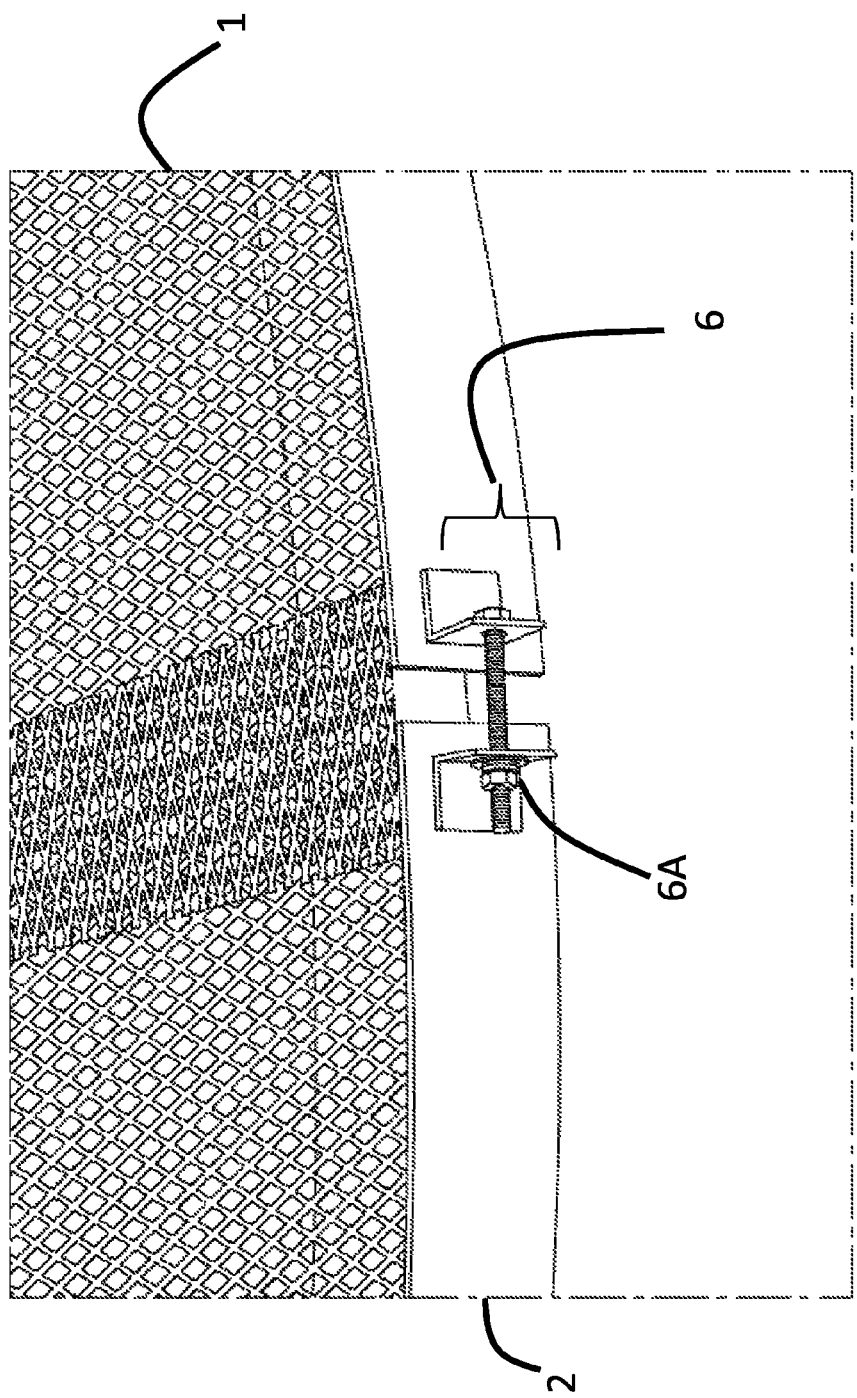

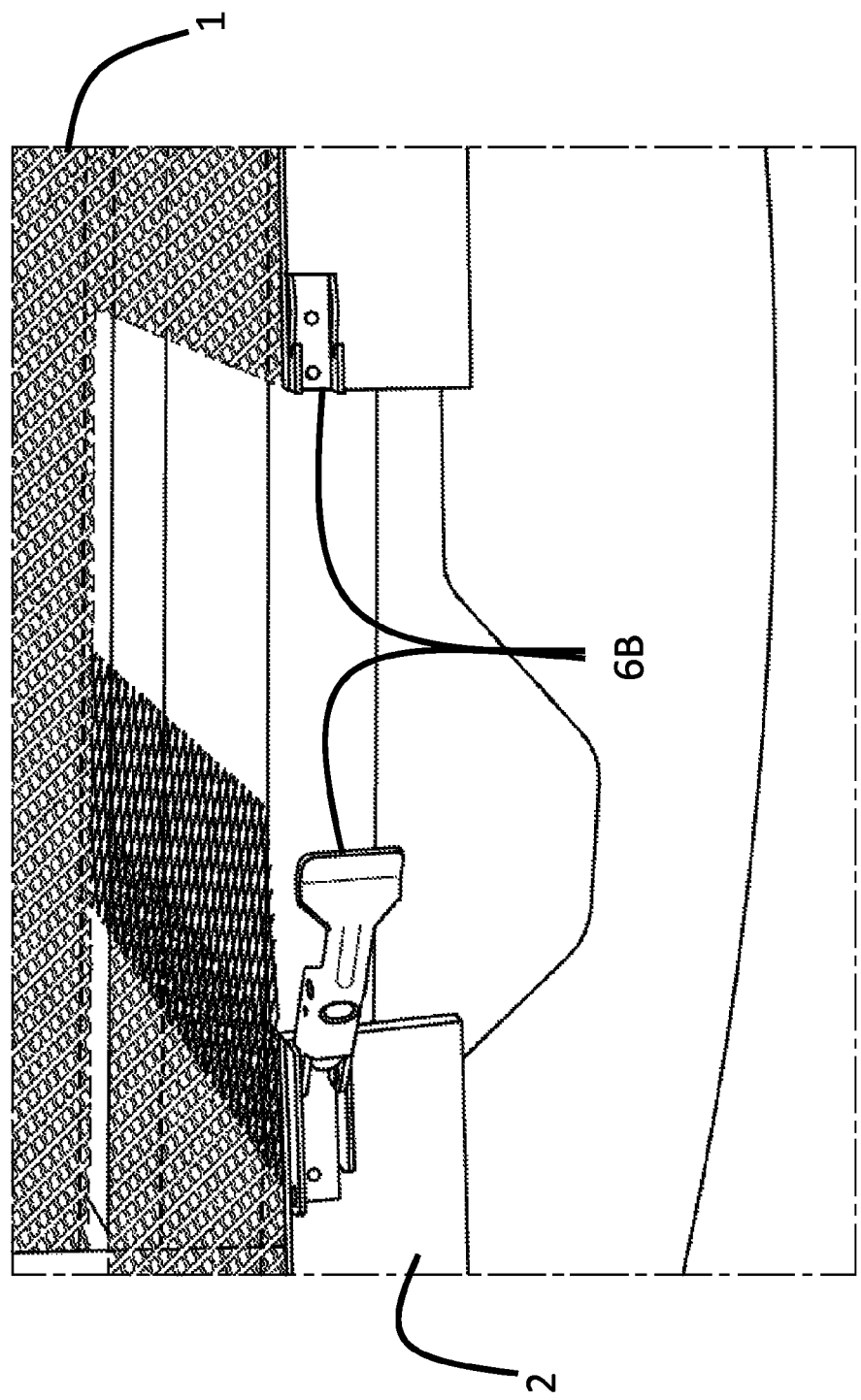

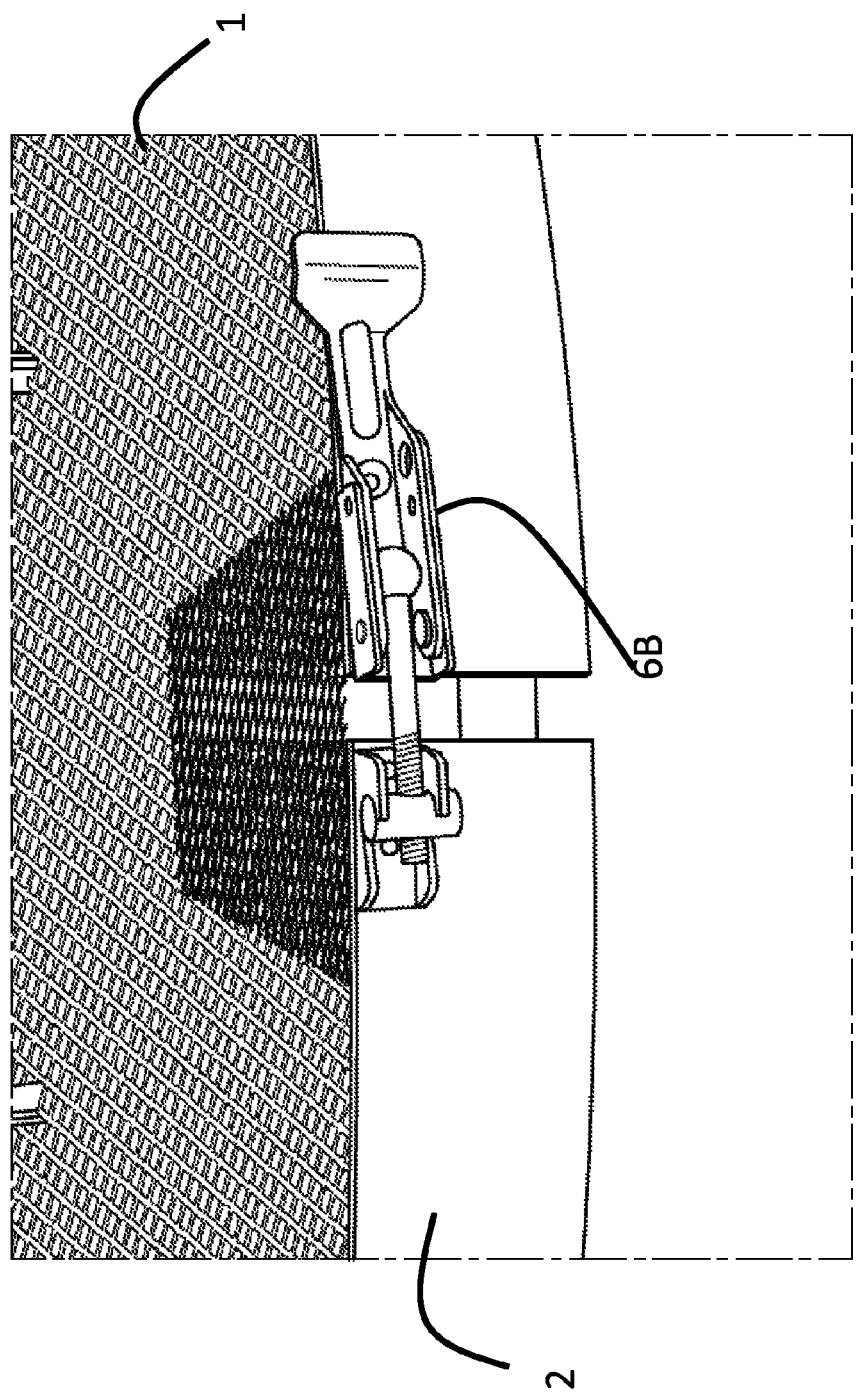

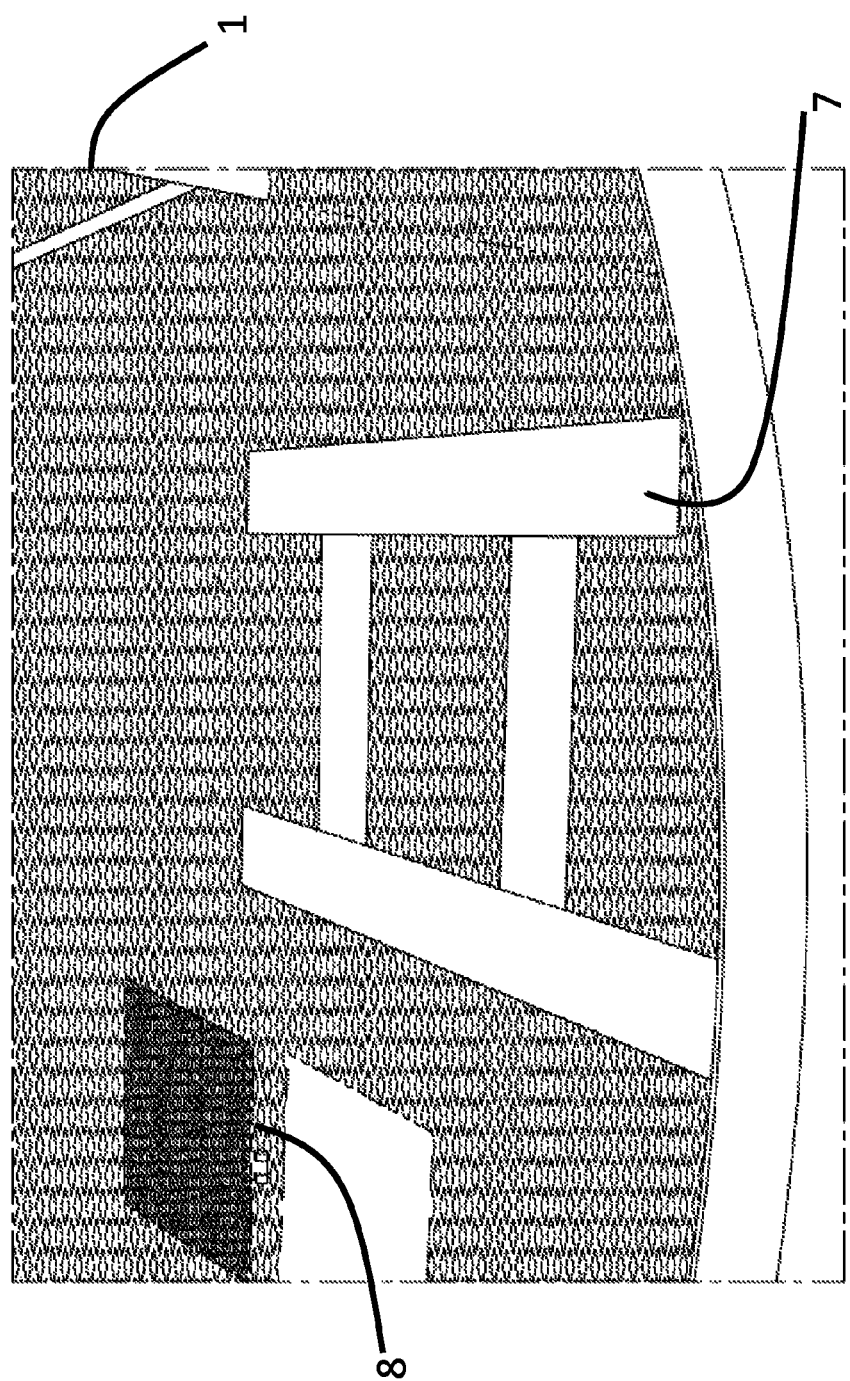

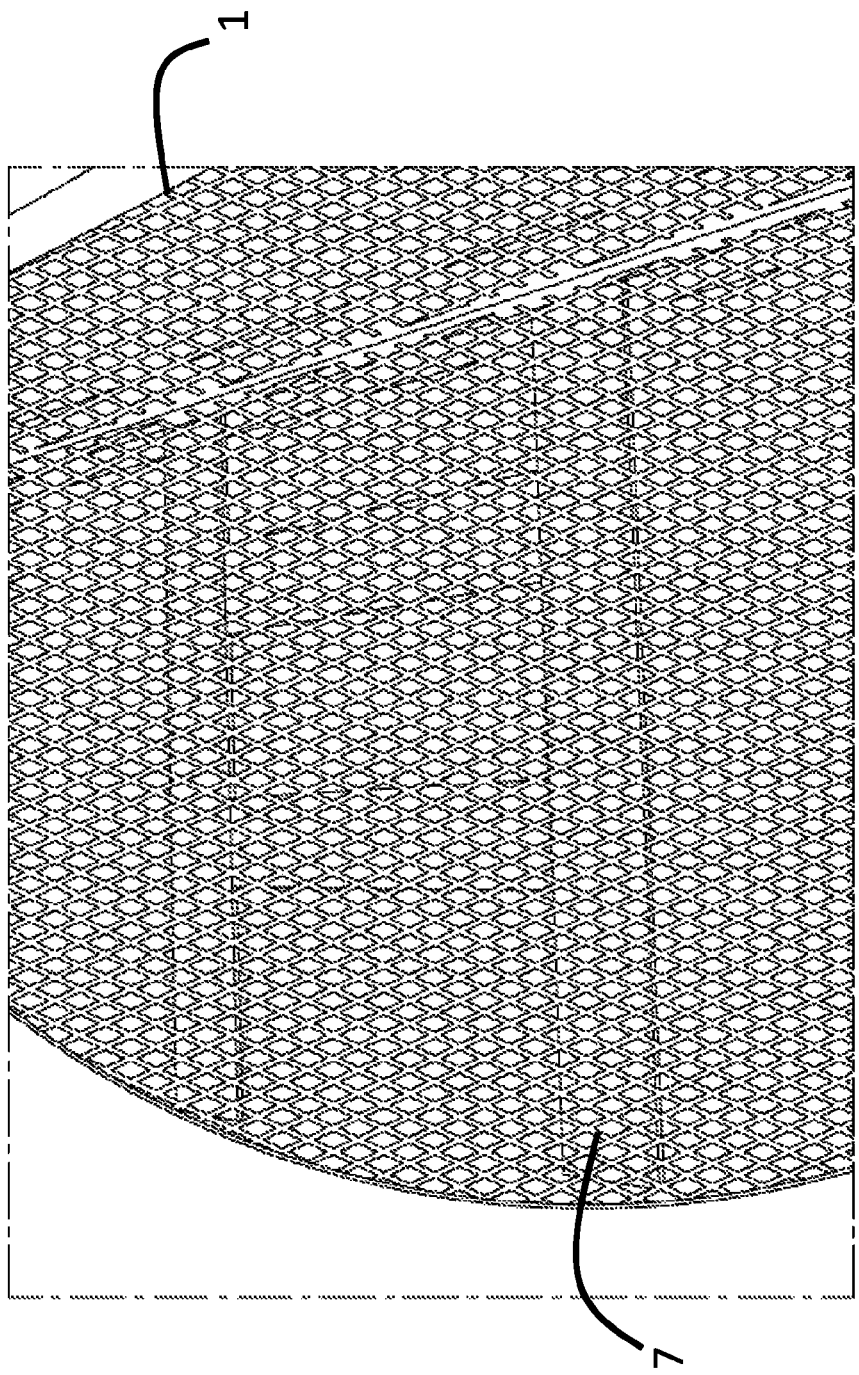

PERFORATED STAND FOR CHEMICAL TANK

CROSS-REFERENCE TO RELATED APPLICATIONS

This application claims priority to provisional Application No. 61/552,231 filed on Oct. 27, 2011. The entire contents of this application is hereby incorporated by reference.

BACKGROUND OF THE INVENTION

1. Field of Art

The invention relates to stands used to hold chemical containment tanks of chemicals over a spill tub, as well as associated screens used to provide ecological protections and to provide human access to the tanks.

2. Discussion of the Background Art

The western U.S. and Alaska are crisscrossed with oil and other pipelines. To facilitate the flow of gas or oil through these pipelines, or to facilitate gas or oil extraction from well heads, pipeline owners place tanks of chemicals alongside of the pipelines or well heads. In natural gas extraction and transport, methanol is added at or near the well head take the moisture out of gas coming out of the ground so the moisture will not corrode the pipe line. In oil extraction, other chemicals, such as drag reducers, may be added.

Because many natural gas well heads are unmanned for much of the time, self-operating chemical injection hardware is positioned near the well head or along the pipeline. Accompanying this equipment are large barrels of chemicals that are to be injected into the well head or pipeline. The chemicals are drawn from the containment tanks via a solar powered pump or other pumping infrastructure. The chemical containment tanks are initially and then periodically filled from a truck having a large reservoir of chemicals. In natural gas sites, a truck will fill the chemical containment tanks to full or nearly full capacity (e.g., 100s of gallons).

Environmental regulations require that most if not all chemicals injected into natural gas and oil well heads and pipelines be prevented from entering the local watershed. Thus, regulations also require oil pipeline owners and operators to remove any contaminated soil that may result from a leak. The procedures to remove contaminated soil are expensive and time-consuming. Also, leaks may result in fines and/or disruptions to operations to facilitate clean up. To avoid these costs, oil and gas companies have begun to place barriers between the chemical barrels and the ground (e.g., spill tubs under the chemical containment tanks) to catch any chemicals that leak during filling or operation. However, environmental regulations also require that wildlife (e.g., birds, mammals, etc.) be prevented from accessing or coming into contact with any chemicals that may spill into the lower spill tubs. In some cases, insects are attracted to any spilled chemicals. Birds, reptiles or small mammals then eat the insects and die from poisoning. In other cases, wildlife dies after drinking rainwater captured in the open spill tubs that may be polluted with chemical spillage. Fines assessed to well owners may vary with the species of animal that is killed due to exposure to the chemicals (e.g., fines for a poisoned eagle may be higher than for other birds).

Thus, oil pipeline owners and operators have a need for chemical spill prevention/mitigation techniques and tools so as to avoid any chemicals from the chemical containment tanks from reaching the ground or the watershed, and to prevent birds and other animals from coming into contact with any chemicals that may be spilled into a corresponding spill tub.

One approach to this need has been to place large metal or poly containment tanks of chemicals in open-topped metal or poly spill tubs. Electro-mechanical equipment used for pumping the chemicals may be installed inside or outside chemical containment tank or the spill tubs. However, these tanks and tubs corrode when exposed to the elements. Furthermore, static electricity can form in or on metal components of the tanks and tubs, leading to further corrosion or to damage to electronic equipment (e.g., pumps) associated with the chemical injection. Furthermore, access to any electronic equipment inside the metal or poly spill tubs, and filling or moving the barrels of chemicals, is difficult to manage.

Thus, as recognized by the present inventor, there is a need for an improved device and technique to avoid any containment from the containment tanks or spill tubs onto the ground or into the watershed, as well as improved protection of wildlife and improved filling and maintenance of the chemical containment tanks, spill tubs and associated equipment.

SUMMARY OF THE INVENTION

One embodiment of the invention is directed to at least one of a stand for a chemical containment tank, and a cover for a spill tub positioned under the chemical containment tank. Other embodiments include at least one of the chemical containment tank, the spill tub, a pump, a battery connected to the pump, and a solar panel connected to the battery and/or the pump.

BRIEF DESCRIPTION OF THE DRAWINGS

FIG. 1 is an image of an assembled stand for a chemical containment tank positioned above a spill tub according to an embodiment of the invention;

FIG. 2A is a close up of a portion of the stand shown in FIG. 1;

FIG. 2C is a close up of a portion of the stand shown in FIG. 1;

FIG. 3B is a close up of a portion of the stand shown in FIG. 1;

FIG. 5A is a close up of a portion of the stand shown in FIG. 1;

FIG. 5C is a close up of a portion of the stand shown in FIG. 1;

FIG. 5D is a close up of a portion of the stand shown in FIG. 1;

FIG. 6A is a close up of a portion of the stand shown in FIG. 1;

FIG. 6B is a close up of a portion of the stand shown in FIG. 1;

DETAILED DESCRIPTION

Figure 2B:
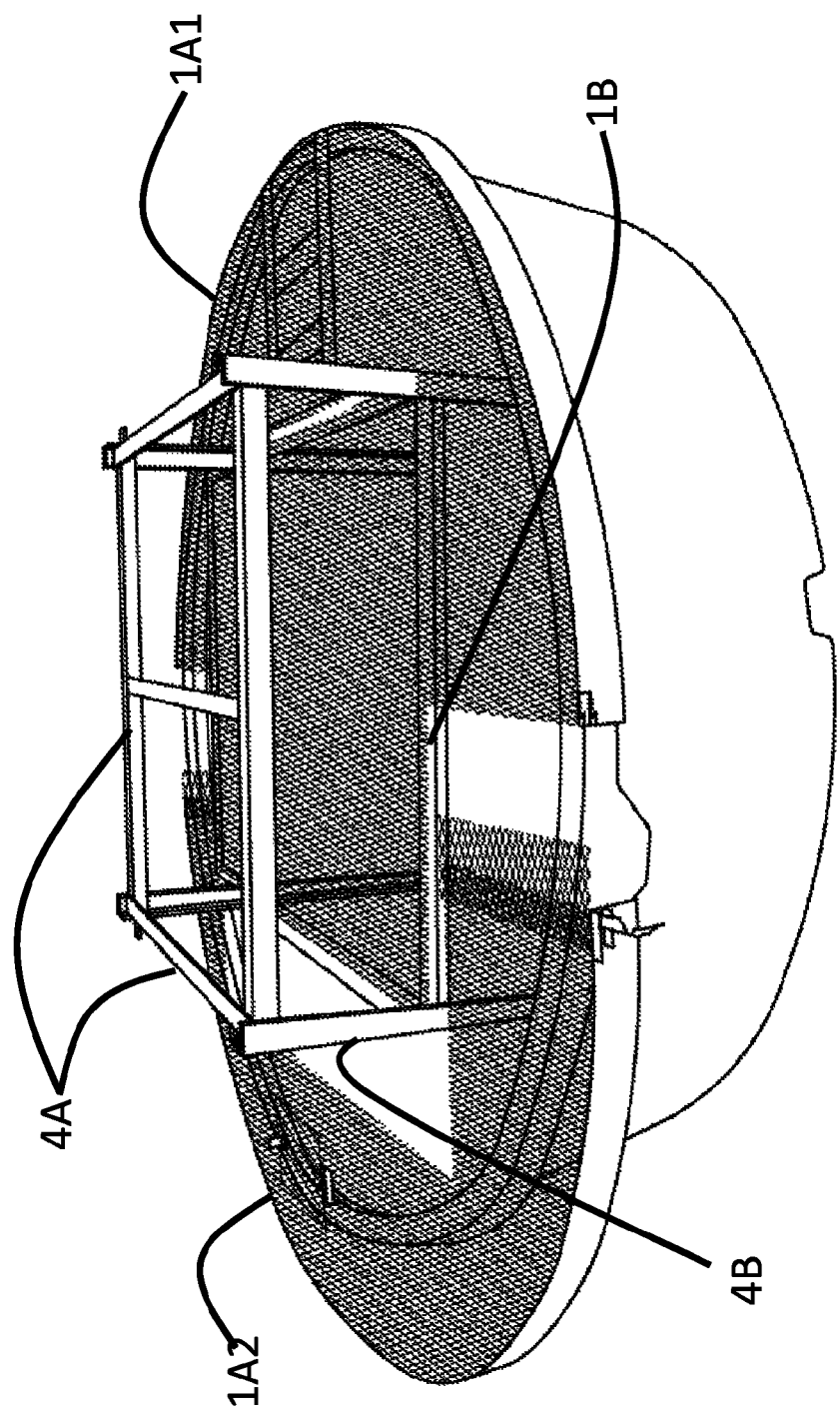
FIG. 2B is a close up of a portion of the stand shown in FIG. 1.
Figure 3A:
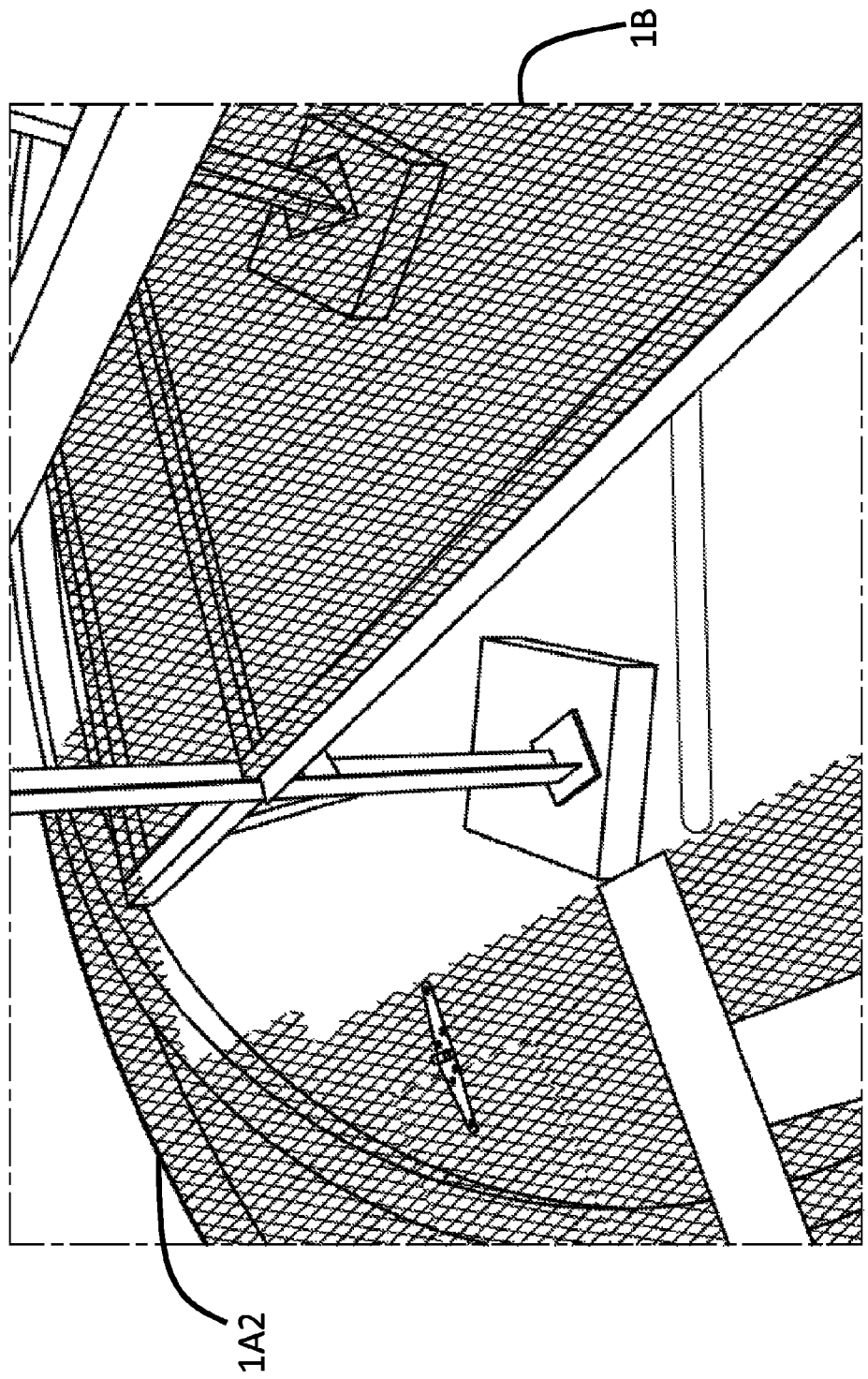
FIG. 3A is a close up of a portion of the stand shown in FIG. 1.
Figure 3C:
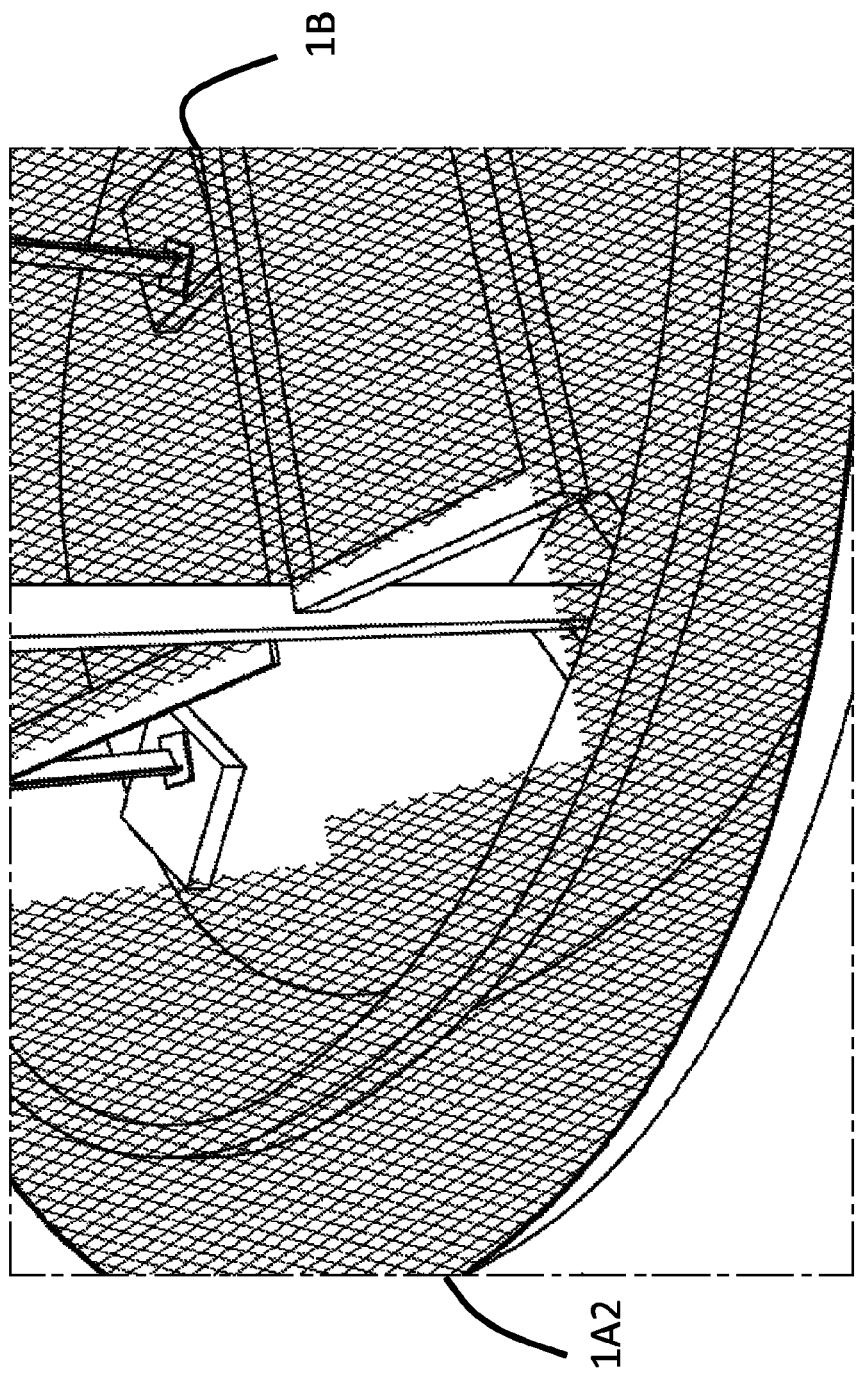
FIG. 3C is a close up of a portion of the stand shown in FIG. 1.
Figure 4:
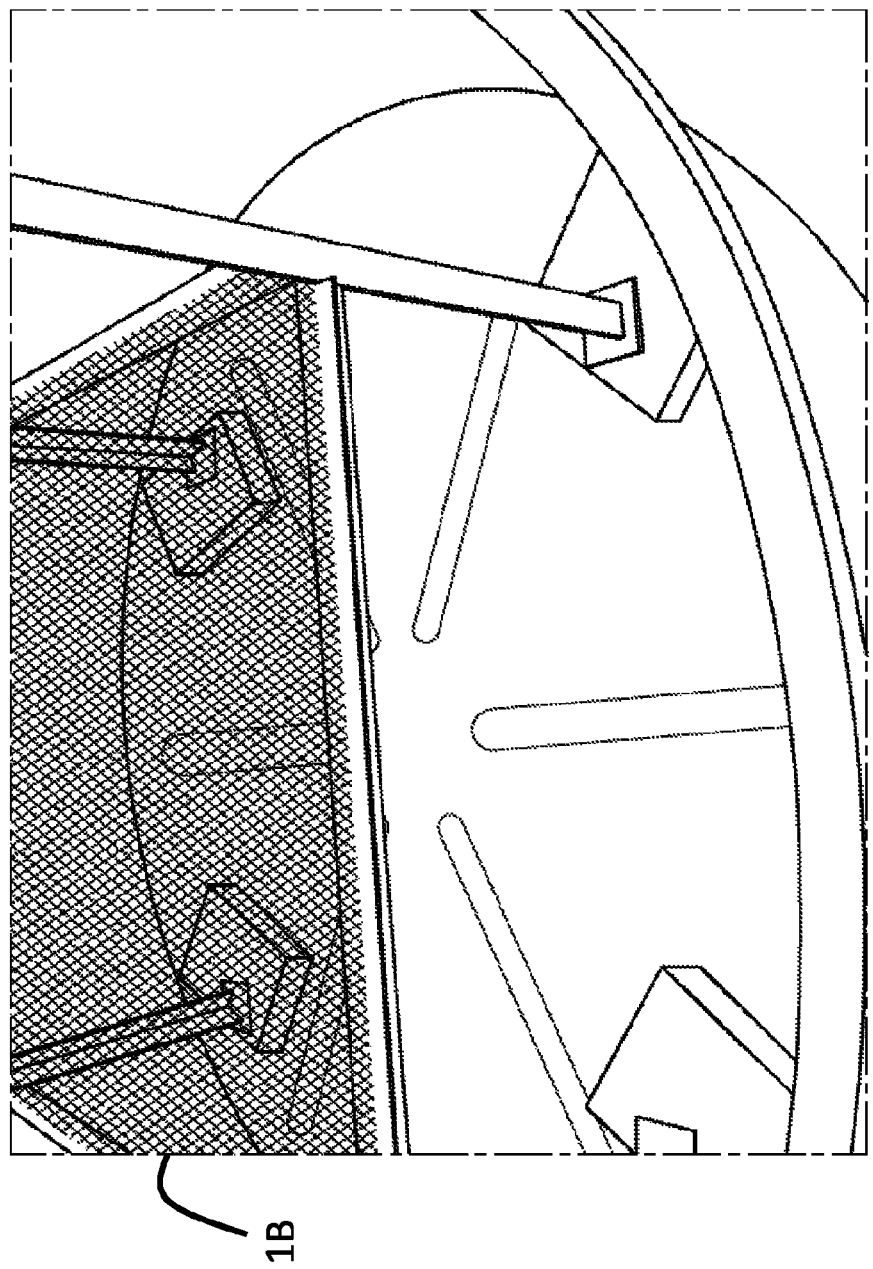
FIG. 4 is a close up of a portion of the stand shown in FIG. 1.
Figure 5B:
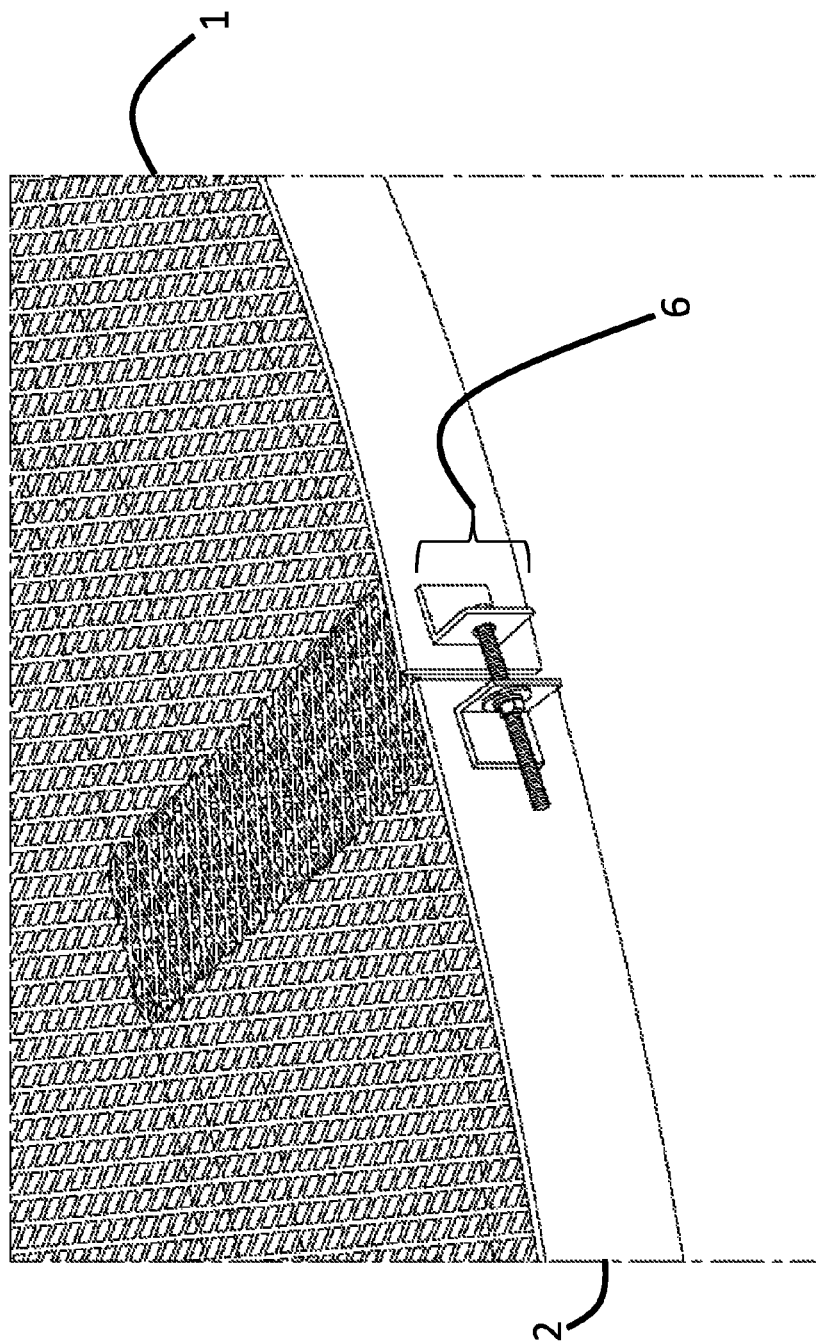
FIG. 5B is a close up of a portion of the stand shown in FIG. 1.

FIG. 1 shows embodiment of the invention is an equipment stand that includes a mesh top (1), a side band (2) for mating to a lower spill tub (3), and a stand 4 to hold a 535 gallon barrel (5) of chemicals (a.k.a., containment tank). The 535 gallon barrel and the spill tub may be made of metal or may be made of a non-corrosive, non-metal material, preferably polyurethane. If the spill tub has a circular shape, the mesh top includes two semicircle portions (1A1 and 1A2) and a center rectangle portion (1B) (FIGS. 2A-2C and FIGS. 3A-3C). If the spill tub has an elliptical shape, the mesh top includes two half-ellipse portions and a center rectangle portion. If the spill tub has a rectangular shape, the mesh top includes two rectangular portions and a center rectangle portion. The center rectangle may be welded or otherwise affixed to a shelf that is welded to the legs of the barrel stand. Optionally, the center rectangle extends beyond the footprint of the legs of the stand. In another embodiment, the center rectangle may be contained within the legs of the barrel stand (FIG. 4). In another embodiment, the center rectangle may be a square. The two semicircle, half-ellipse or rectangular portions are connectable to each other and are configured to abut to the center rectangle portion to form a single body over the opening of the spill tub. In another embodiment, the two semicircle, half-ellipse or rectangular portions may overlap where they meet (e.g., along a center diameter of the spill tub.)

The metal side bands (e.g., 3 inches by 1/16 to 1/8 inches) mate to the spill tub. For example, the interior surface of the metal side bands may face the outer surface of the upper lip of the spill tub. The two semicircle, half-ellipse or rectangular portions are welded to the metal side bands (e.g., 3 inches by 1/16 to 1/8 inches). The two semicircle, half-ellipse or rectangular portions are bolted or latched together with a fastening system (6) (FIGS. 5A-5D) to allow the two semicircle, half-ellipse or rectangular portions to be taken apart for access to the interior of the spill tub. In one embodiment, the two semicircle, half-ellipse or rectangular portions designed to fit snugly on the top rim of the spill tub. In one embodiment, the two semicircle, half-ellipse or rectangular portions are shaped to rest on ledges welded to the center supports of the stand.

At least one of the semicircle, half-ellipse or rectangular portions includes at least one stand (7) for holding a human loaded with equipment and at least one access port (8) that is wide enough for a person to reach into the spill tub or wide enough for a suction hose or other equipment to pass through. Preferably, the at least one stand for holding a human includes a) flat metal strips welded to form a ladder shape to provide maximum strength and b) some mesh surface to allow liquids to pass through to the spill tub (FIGS. 6A-6B). The stand for the human must be strong enough to hold 300 lbs (e.g., a large man loaded with a variety of gear and material.) The pieces of the stand may be welded together and then welded to the top (FIG. 6A) or the bottom (FIG. 6B) of the mesh of the corresponding semicircle, half-ellipse or rectangular portion. Alternatively, at least one of the semicircle, half-ellipse or rectangular portions may be cut to facilitate insertion of the stand into the mesh, with the mesh of the semicircle, half-ellipse or rectangular portion welded to all sides of the stand.

Figure 7A:
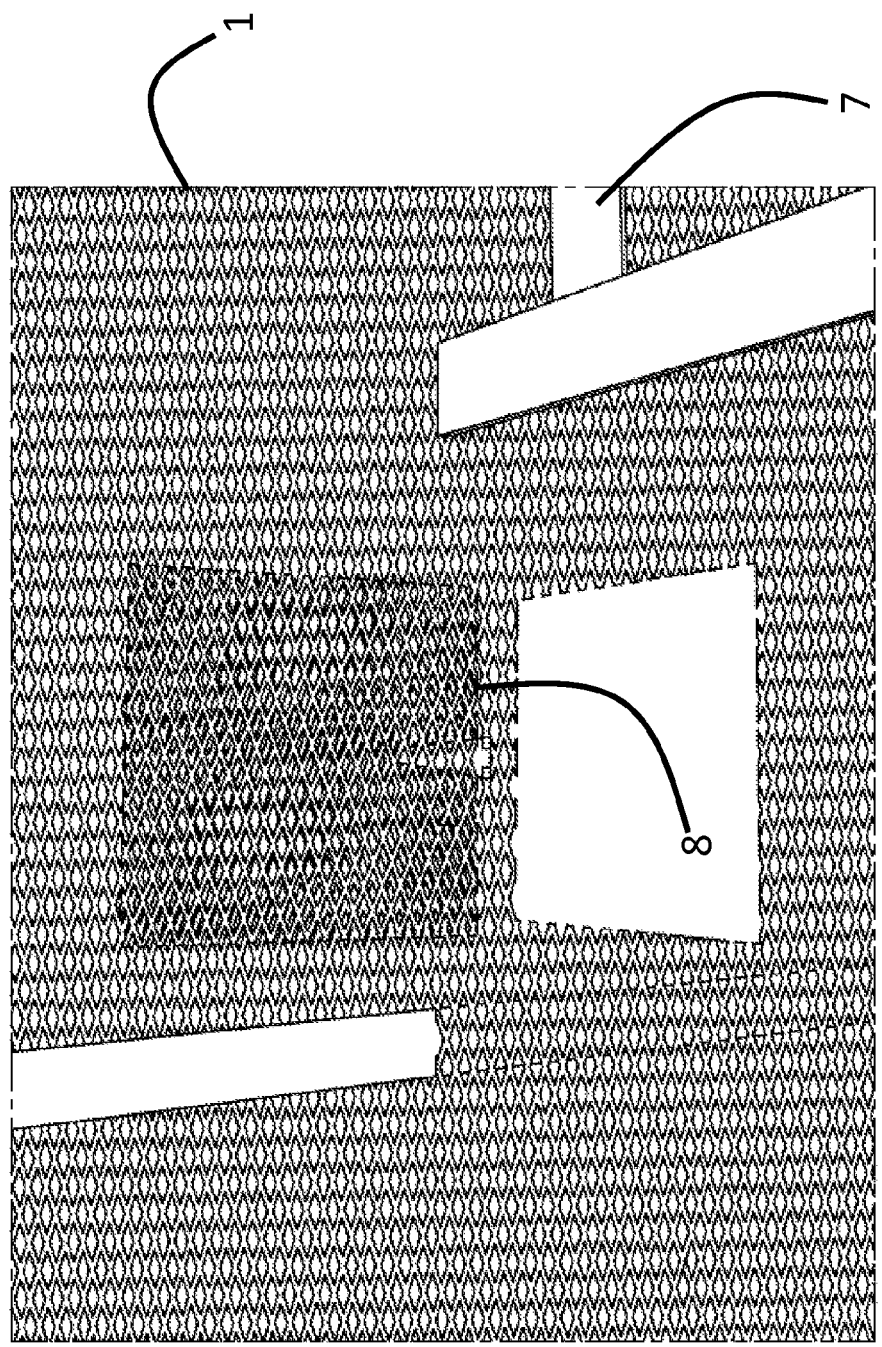
FIG. 7A is a close up of a portion of the stand shown in FIG. 1.
Figure 7B:
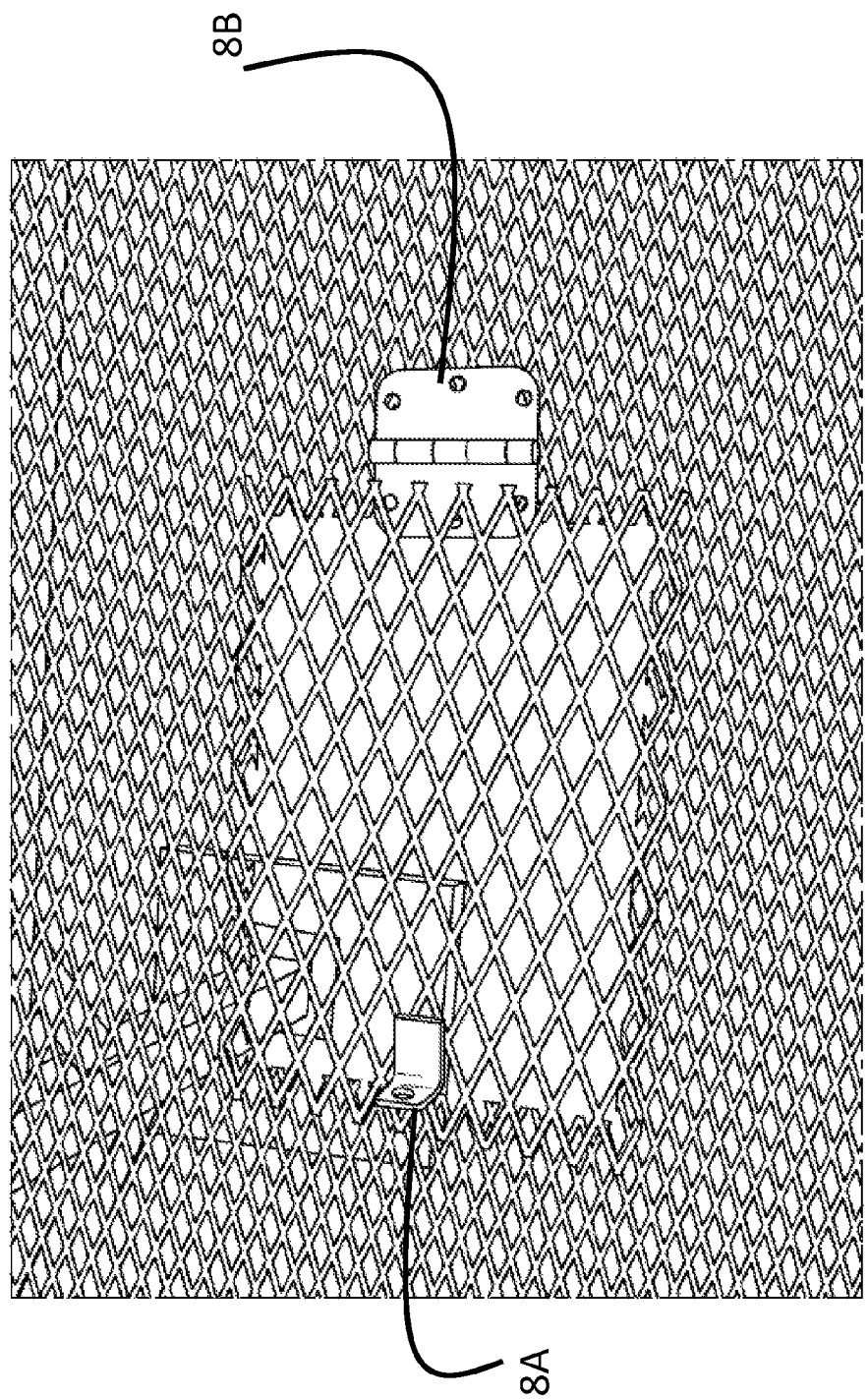
FIG. 7B is a close up of a portion of the stand shown in FIG. 1.

The access port (8) may include a handle (8A) that includes a hasp to allow for locking the port with a padlock or combination lock (FIGS. 7A-7B). The access port 18 may include one or more hinge elements (8B) welded to the corresponding semicircle, half-ellipse or rectangular portion.

L-shaped flanges (6A) with eyes (FIGS. 5A-5B) or latches (6B) (FIGS. 5C-5D) are welded onto the outer surface of the ends of the metal side bands of the two semicircle, half-ellipse or rectangular portions, thus locking the two semicircle, half-ellipse or rectangular portions together and forming a stable and strong surface.

Figure 8A:
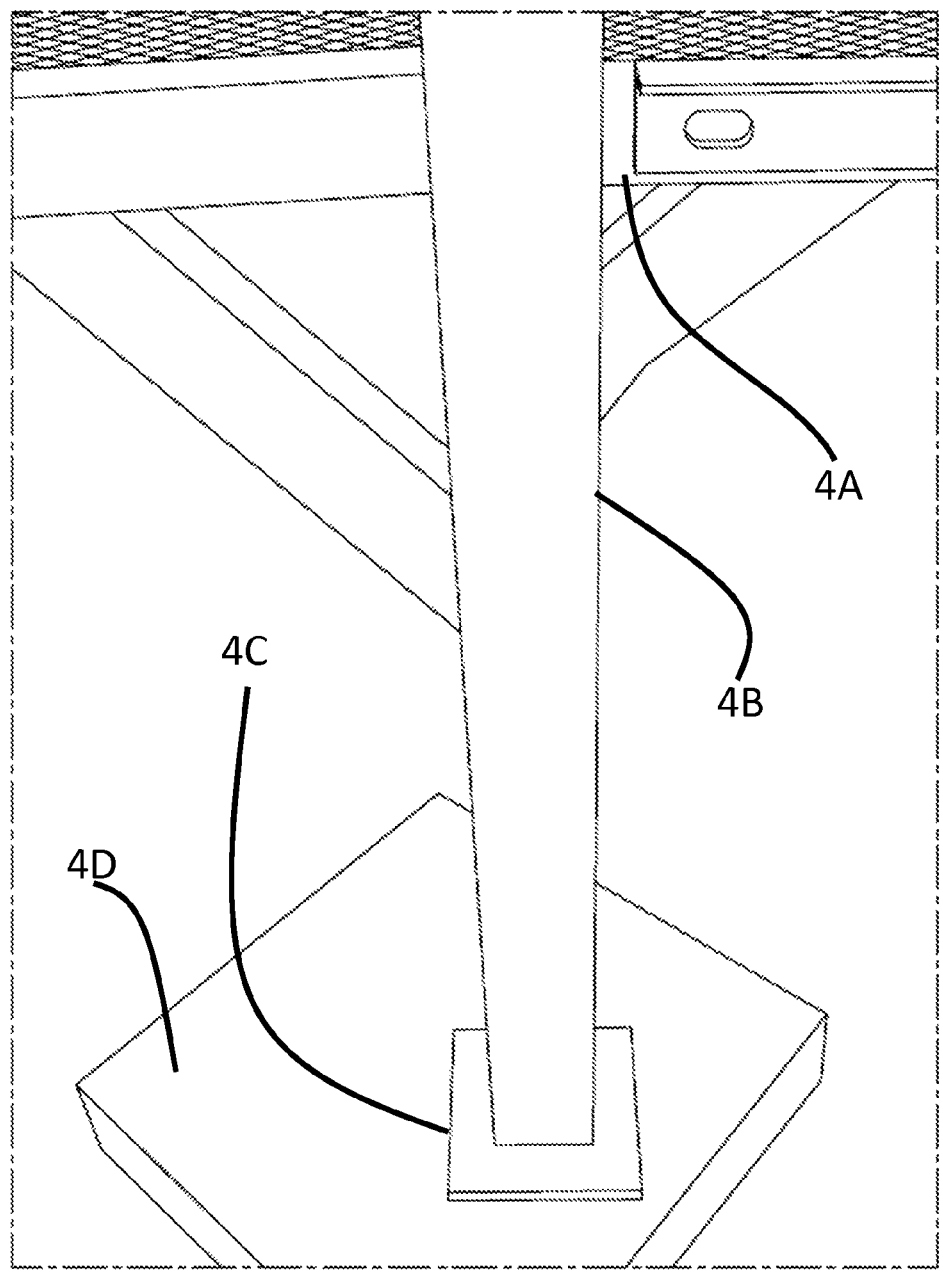
FIG. 8A is a close up of a portion of the stand shown in FIG. 1.
Figure 8B:
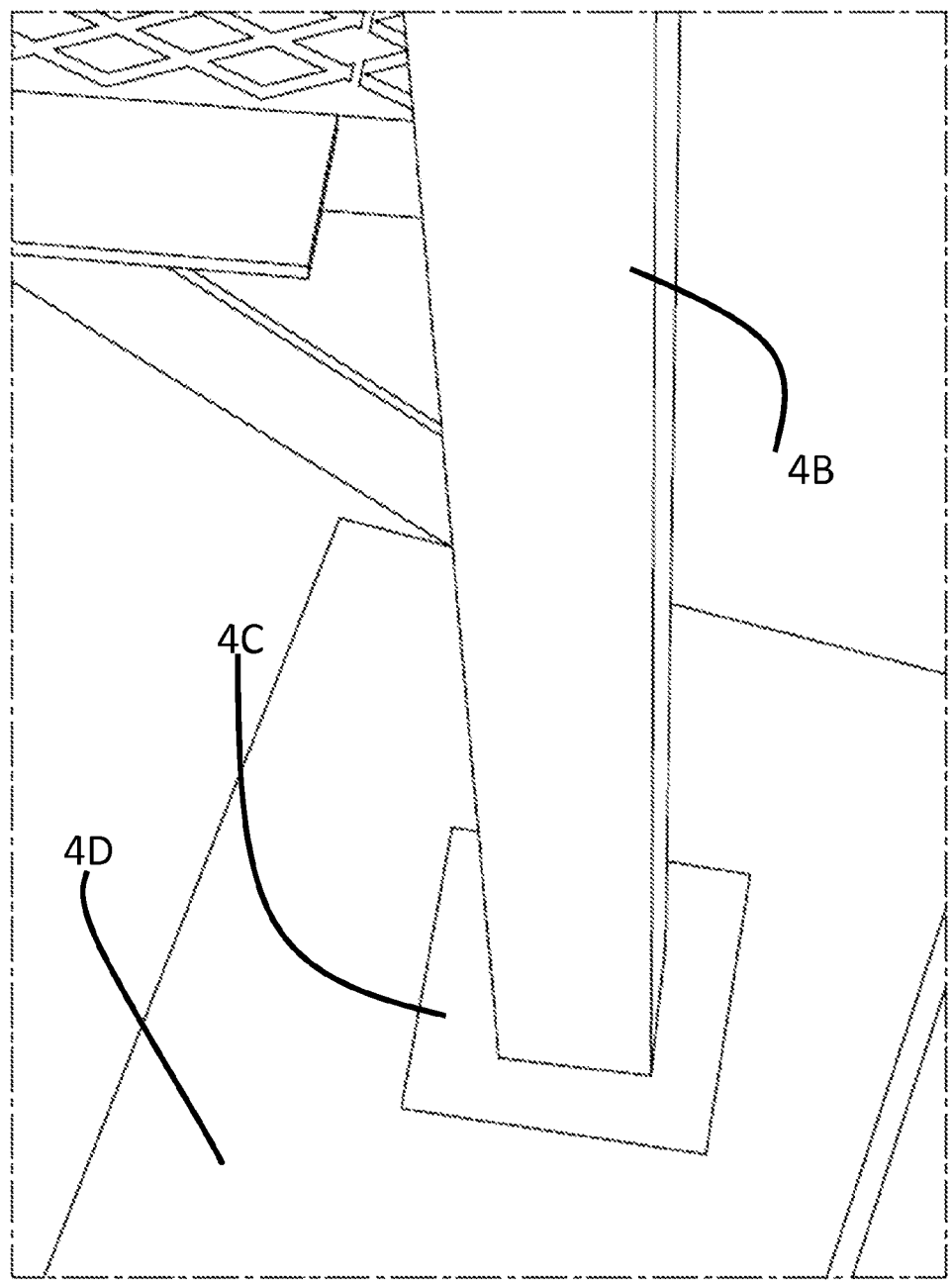
FIG. 8B is a close up of a portion of the stand shown in FIG. 1.

The stand includes four vertical legs (4B) welded to two top cross bars (4A) in one horizontal direction and at least two top cross bars (4A) in an orthogonal horizontal direction so as to form a square or rectangle (FIGS. 8A-8B). The top cross bars are used to hold the 535 gallon tank over the spill tub. At least one set of opposing outer top cross bars include at least four L-shaped flanges (at least two per side) with eyes for attaching straps that hold the 535 gallon tank stably on top of the stand. Preferably, the straps are braided steel.

The rectangular/square mesh (1B) welded to a lower shelf of the stand may also be supported by two middle cross bars in one horizontal direction and 2-3 middle cross bars in an orthogonal horizontal direction. These middle cross bars may be supported by support struts that are welded to the legs and the cross bars. The support struts may be angled 45 degrees from vertical legs and the lower horizontal cross bars.

Alternatively, welded to the legs of the stand for support are also at least four L-metal struts that are welded at an angle (e.g., a 45 degree angle) from vertical legs to the horizontal lower cross bars.

In one embodiment, the rectangular mesh (1B) that is welded to the legs of the stand extends horizontally beyond the periphery of the legs (FIG. 2C) to hold electromechanical equipment (9) such as a pump, a flowmeter and/or battery box that is connected to a solar panel so as to provide electrical power to the pump in day and evening hours. The pump is used to pump the chemicals from the chemical containment tank into the wellhead or into the pipeline. In this embodiment, additional 45 degree support struts are used to provide support to the portion of the rectangular mesh and frame that extends outside of the legs of the stand. An advantage of this configuration is that the electronic equipment is easily accessible to a worker who is standing on the mesh to fill the chemical containment tank or to otherwise perform maintenance on the installation, or to a worker standing outside of the spill tub.

To provide support, flat flanges (4C) are welded to the lower ends of each of the vertical legs (4B) so as to act as feet. These feet may rest on the bottom inner surface of the spill tub. Preferably, the feet rest on wood blocks (4D) to minimize abrasion or other damage to the interior of the spill tub that would result in leaks into the soil.

In the preceding description, the spill tub is circular, and the two detachable pieces of mesh are formed in a substantially semicircle shape. However, in other embodiment, the spill tub may be a different shape. Here, the two detachable pieces of metal mesh will have a shape and size of half of the upper opening of the different shaped spill tub, excluding the mesh portion welded to a lower shelf of the stand.

In the preceding embodiments, the mesh is preferably made of extruded steel or another metal so as to be strong enough to hold a loaded worker and light enough to be carried by two men, and light enough to be manually positioned over the spill tub or removed from the spill tub. In one embodiment, the mesh is made of a rust free metal. In another embodiment, the metal mesh may be coated with a plastic coating or with a non-skid coating. In another embodiment, the mesh may be made of a non-metal material such as polycarbon or another material that will hold a loaded worker and that will not be torn apart by wildlife seeking to gain access to the spill tub. In all embodiments, the holes in the mesh are sized to maximize flow of spillage into the spill tub (i.e., minimize puddles of spilled chemicals on the surface of the mesh) while being able to safely hold a loaded worker.

The invention claimed is:

1. A chemical injection system for a natural gas or oil extraction site, comprising:
   means for securing and holding a chemical containment tank over a spill tub having an open top; and
   means for covering the spill tub,
   wherein the means for securing and holding comprises four legs forming a rectangle of approximately the same size a footprint of the chemical containment tank, and
   wherein the means for covering comprises:
      a rectangular mesh surface welded to a shelf between the four legs, and
      two connectable mesh portions configured to be connected to each other and to abut to the rectangular mesh surface so as to form a substantially flat mesh surface over the spill tub.

2. The chemical injection system of claim 1, wherein the two connectable mesh portions each include a metal band welded thereto, each metal band configured to snugly mate to the open top of the spill tub.

3. The chemical injection system of claim 2, wherein the metal bands of the two connectable mesh portions each include L-shaped flanges with eyes configured to align and to accept a bolt for securing the two connectable mesh portions to each other.

4. The chemical injection system of claim 1, wherein at least one of the two connectable mesh portions includes at least one of:
   a hinged access port welded thereto; or
   a ladder shaped stand welded thereto.

5. The chemical injection system of claim 1, wherein the rectangular mesh surface includes a mesh surface that extends beyond an interior footprint of the legs so as to form an equipment stand.

6. The chemical injection system of claim 5, wherein the means for securing and holding further includes struts welded to the equipment stand and welded at an angle to two adjacent legs of the four legs.

7. The chemical injection system of claim 1, further comprising equipment on the means for covering the spill tub, the equipment including a pump and a battery connected to the pump.

8. The chemical injection system of claim 7, further comprising:
   a solar panel mounted to the chemical containment tank and electrically connected to at least one of the battery or the pump.

9. The chemical injection system of claim 1, further comprising:
   the chemical containment tank; and
   the spill tub,
   wherein the chemical containment tank and the spill tub are made of a plastic or metal material, and
   wherein the spill tub has a circular, elliptical or rectangular shape.

10. The chemical injection system of claim 1,
    wherein the spill tub has a circular, elliptical or rectangular shape, and
    wherein the two connectable mesh portions each have a corresponding semi-circular, half-elliptical or half-rectangular outer shape.

11. A chemical injection system for a natural gas or oil extraction site, comprising:
    means for securing and holding a chemical containment tank over a spill tub having an open top; and
    means for covering the spill tub,
    wherein the means for securing and holding includes:
       four top cross bars welded to form a rectangle; and
       two L-shaped flanges with eyes welded to each of a parallel pair of the four top cross bars and configured to securely hold two parallel straps passing over the chemical containment tank so as to secure the chemical containment tank to the four top cross bars welded to form a rectangle.

12. The chemical injection system of claim 11, wherein the means for securing and holding comprises four legs forming a rectangle of approximately the same size a footprint of the chemical containment tank, and wherein the means for covering comprises: a rectangular mesh surface welded to a shelf between the four legs, and two connectable mesh portions configured to be connected to each other and to abut to the rectangular mesh surface so as to form a substantially flat mesh surface over the spill tub, and wherein the two connectable mesh portions each include a metal band welded thereto, each metal band configured to snugly mate to the open top of the spill tub.

13. The chemical injection system of claim 12, wherein the metal bands of the two connectable mesh portions each include L-shaped flanges with eyes configured to align and to accept a bolt for securing the two connectable mesh portions to each other.

14. The chemical injection system of claim 12, wherein at least one of the two connectable mesh portions includes at least one of: a hinged access port welded thereto; or a ladder shaped stand welded thereto.

15. The chemical injection system of claim 12, wherein the rectangular mesh surface includes a mesh surface that extends beyond an interior footprint of the legs so as to form an equipment stand.

16. The chemical injection system of claim 15, wherein the means for securing and holding further includes struts welded to the equipment stand and welded at an angle to two adjacent legs of the four legs.

17. The chemical injection system of claim 11, further comprising:
    equipment on the means for covering the spill tub, the equipment including:
    a pump; and a battery connected to the pump.

18. The chemical injection system of claim 17, further comprising: a solar panel mounted to the chemical containment tank and electrically connected to at least one of the battery or the pump.

19. The chemical injection system of claim 11, further comprising:
    the chemical containment tank; and the spill tub, wherein the chemical containment tank and the spill tub are made of a plastic or metal material, and
    wherein the spill tub has a circular, elliptical or rectangular shape.

20. The chemical injection system of claim 12,
    wherein the spill tub has a circular, elliptical or rectangular shape, and
    wherein the two connectable mesh portions each have a corresponding semi-circular, half-elliptical or half-rectangular outer shape.

* * * * *